United States Patent
Zhang et al.

(10) Patent No.: US 10,534,190 B2
(45) Date of Patent: Jan. 14, 2020

(54) NAKED-EYE THREE DIMENSIONAL DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Guiyu Zhang, Beijing (CN); Ming Hu, Beijing (CN); Ming Zhang, Beijing (CN); Jing Wang, Beijing (CN); Zouming Xu, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 15/564,360

(22) PCT Filed: Apr. 11, 2017

(86) PCT No.: PCT/CN2017/080028
§ 371 (c)(1),
(2) Date: Oct. 4, 2017

(87) PCT Pub. No.: WO2018/049814
PCT Pub. Date: Mar. 22, 2018

(65) Prior Publication Data
US 2018/0314075 A1 Nov. 1, 2018

(30) Foreign Application Priority Data

Sep. 14, 2016 (CN) .................... 2016 2 1058121 U

(51) Int. Cl.
*G02B 27/22* (2018.01)
*G02B 27/26* (2006.01)
(Continued)

(52) U.S. Cl.
CPC ......... *G02B 27/2214* (2013.01); *G02B 27/26* (2013.01); *G02F 1/1347* (2013.01);
(Continued)

(58) Field of Classification Search
CPC .................... G02B 27/2214; G02F 1/13338
See application file for complete search history.

(56) References Cited

U.S. PATENT DOCUMENTS

2011/0149218 A1* 6/2011 Nakayama .............. B32B 37/02
349/106
2013/0208195 A1* 8/2013 Cho .................. G02F 1/134309
349/15

(Continued)

FOREIGN PATENT DOCUMENTS

CN 202330876 U 7/2012
CN 103135280 A 6/2013
(Continued)

OTHER PUBLICATIONS

International Search Report and Written Opinion dated Jun. 28, 2017; PCT/CN2017/080028.

*Primary Examiner* — Alexander P Gross

(57) ABSTRACT

Provided is a naked-eye three dimensional display device including: a third substrate, a second liquid crystal layer, a first electrode and a second electrode and a two dimensional display panel including a first substrate, a second substrate and a first liquid crystal layer disposed between the first substrate and the second substrate; the third substrate is disposed opposite to the second substrate on a side of the second substrate away from the first substrate; the second (Continued)

liquid crystal layer is disposed between the second substrate and the third substrate; the first electrode and the second electrode are disposed between the second substrate and the third substrate, and the first electrode and the second electrode are configured to apply an electric field to liquid crystal in the second liquid crystal layer to form a light splitting device for three dimensional display.

12 Claims, 2 Drawing Sheets

(51) Int. Cl.
*H04N 13/30* (2018.01)
*G02F 1/1335* (2006.01)
*G02F 1/1343* (2006.01)
*G02F 1/1347* (2006.01)
*G06F 3/041* (2006.01)
*G06F 3/044* (2006.01)
*G02F 1/1333* (2006.01)

(52) U.S. Cl.
CPC .... *G02F 1/13439* (2013.01); *G02F 1/133528* (2013.01); *G02F 1/134309* (2013.01); *G06F 3/044* (2013.01); *G06F 3/0412* (2013.01); *H04N 13/30* (2018.05); *G02F 1/13338* (2013.01); *G02F 2001/133354* (2013.01)

(56) References Cited

U.S. PATENT DOCUMENTS

| | | | |
|---|---|---|---|
| 2014/0111715 A1* | 4/2014 | Jeong | G02B 27/26 349/15 |
| 2014/0327849 A1 | 11/2014 | Tsai et al. | |
| 2015/0109547 A1* | 4/2015 | Kim | G02F 1/133305 349/12 |
| 2015/0130751 A1* | 5/2015 | Teraguchi | G02F 1/13338 345/174 |
| 2015/0168761 A1* | 6/2015 | Chang | G02F 1/13338 349/12 |
| 2016/0328055 A1* | 11/2016 | Wu | G09G 5/003 |
| 2017/0048515 A1* | 2/2017 | Imai | G03B 35/24 |
| 2017/0081589 A1 | 3/2017 | Wu et al. | |
| 2017/0085865 A1* | 3/2017 | Sumi | H04N 13/324 |
| 2017/0139274 A1* | 5/2017 | Hirota | G02F 1/133528 |

FOREIGN PATENT DOCUMENTS

| | | | |
|---|---|---|---|
| CN | 204422933 U | * | 6/2015 |
| CN | 204422933 U | | 6/2015 |
| CN | 105086645 A | | 11/2015 |
| CN | 206002779 U | | 3/2017 |

* cited by examiner

NAKED-EYE THREE DIMENSIONAL DISPLAY DEVICE

TECHNICAL FIELD

At least one embodiment of the present disclosure relates to a naked-eye three dimensional display device.

BACKGROUND

With development of a liquid crystal display technology, a three dimensional (3D) display technology has attracted more and more attention, the 3D display technology can enable a picture to become stereoscopic and vivid, its principle lies in that left and right eyes of a person are used to receive different pictures respectively, and image information is superimposed and regenerated by a brain to reestablish an image with a stereoscopic display effect.

SUMMARY

At least one embodiment of the present disclosure relates to a naked-eye three dimensional display device; by using such naked-eye three dimensional display device, the usage amount of one substrate can be reduced, a process is simplified, a laminating process is not needed, a yield is improved, and an investment of high-precision devices is reduced. Because the usage amount of one substrate is reduced, a placing height is reduced, and a viewing distance can be reduced.

At least one embodiment of the present disclosure provides a naked-eye three dimensional display device, comprising: a two dimensional display panel, comprising a first substrate, a second substrate and a first liquid crystal layer disposed between the first substrate and the second substrate; a third substrate, disposed opposite to the second substrate on a side of the second substrate away from the first substrate; a second liquid crystal layer, disposed between the second substrate and the third substrate; wherein a first electrode and a second electrode are disposed between the second substrate and the third substrate, and the first electrode and the second electrode are configured to apply an electric field to liquid crystal in the second liquid crystal layer to form a light splitting device for three dimensional display.

REFERENCE SIGNS

01—two dimensional display panel; 011—lower substrate; 012—upper substrate; 013—liquid crystal layer; 015—upper polarizing sheet; 016—lower polarizing sheet; 017—sealant; 02—liquid crystal grating; 020—sealant; 021—upper substrate; 022—liquid crystal layer; 023—strip electrode; 024—planar electrode; 025—upper polarizing sheet; 026—touch control layer; 027—insulating layer; 028—lower substrate; 029—lower polarizing sheet; 03—Optical Clear Resin (OCR)/Optical Clear Adhesive (OCA); 04—placing height; 100—two dimensional display panel; 101—first substrate; 102—second substrate; 103—first liquid crystal layer; 104—alignment mark; 105 polarizing layer; 106—first polarizing sheet; 107—first sealant; 200—light splitting device; 201—third substrate; 202—second liquid crystal layer; 203—first electrode; 204—second electrode; 205—second polarizing sheet; 206 touch control electrode; 207—insulating layer; 208—second sealant

DETAILED DESCRIPTION

In order to make objects, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the present disclosure. Based on the described embodiments herein, those skilled in the art can obtain other embodiment(s), without any inventive work, which should be within the scope of the present disclosure.

Unless otherwise specified, the technical terms or scientific terms here should be of general meanings as understood by those ordinarily skilled in the art. In the specification and claims of the present disclosure of the patent application, words such as "first", "second" and the like do not denote any order, quantity, or importance, but rather are used for distinguishing different components. Words such as "include" or "comprise" and the like denote that elements or objects appearing before the words of "include" or "comprise" cover the elements or the objects enumerated after the words of "include" or "comprise" or equivalents thereof, not exclusive of other elements or objects. "Connected" or "coupled" or similar words are not limited to physical or mechanical connection, and may comprise electrical connection, either direct or indirect connection. Words such as "up", "down", "left", "right", "horizontal", "vertical" and the like are only used for expressing relative positional relationship, when the absolute position of a described object is changed, the relative positional relationship may also be correspondingly changed.

Figure 1:
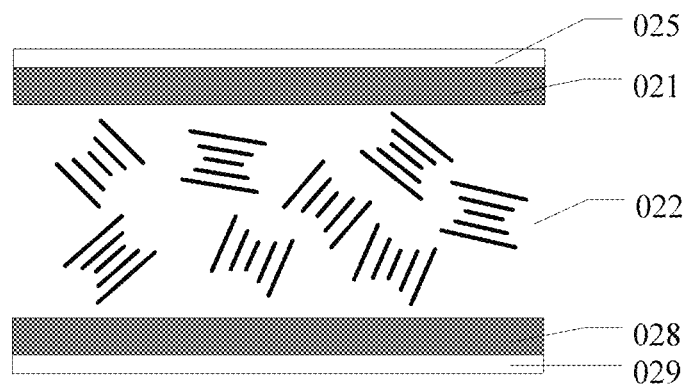
FIG. 1 is a schematic diagram of a liquid crystal grating.

In order to realize a three dimensional (3D) display effect, a layer of liquid crystal grating can be added on a display screen. As shown in FIG. 1, the liquid crystal grating generally consists of an upper polarizing sheet 025, a lower polarizing sheet 029, an upper substrate 021, a lower substrate 028 and a liquid crystal layer 022 between the upper and lower substrates, and the upper and lower substrates can have a strip electrode and a planar electrode respectively. When powered on, liquid crystal molecules in a region directly facing to the strip electrodes and the planar electrode are deflected, the liquid crystal molecules are arrayed perpendicular to the substrates, light rays cannot transmit through, and a dark region (black region) is formed; the liquid crystal molecules in the region without the strip electrode are not subjected to an action of the electric field and are not deflected, the light rays transmit through a liquid crystal cell (Cell) and form a bright region, in this way, multiple alternately bright and dark stripes can be formed. For example, under such mode, when an image viewed by a left eye is displayed on a liquid crystal screen, the non-transparent stripes will shield a right eye, similarly, when an image viewed by the right eye is displayed on the liquid crystal screen, the non-transparent stripes will shield the left eye. Thus, visible images are separated by the left eye and the right eye to realize a 3D display effect.

Figure 2:
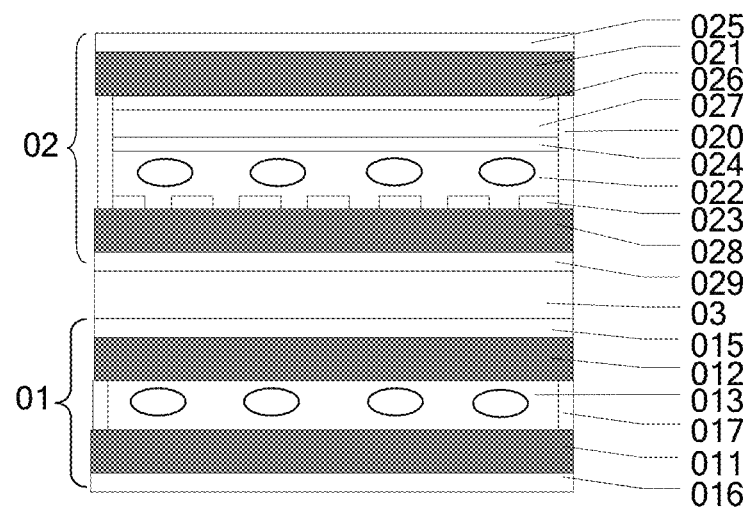
FIG. 2 is a schematic diagram of a naked-eye three dimensional display device.

A naked-eye 3D touch display panel having a touch control function needs to be formed by laminating the liquid crystal grating with a two dimensional (2D) display panel, as shown in FIG. 2. A manufacturing manner for the liquid crystal grating is as follows: forming a touch control layer 026, an insulating layer 027 and a planar electrode 024 on the upper electrode 021, forming strip electrodes 023 on the lower substrate 028, finally performing box forming on the upper substrate 021 and the lower substrate 028, injecting the liquid crystal layer 022, then sealing by a sealant 020, thereby forming a liquid crystal grating 02 having a touch control function. The 2D display panel 01 includes an upper substrate 012, a lower substrate 011 and a liquid crystal layer 013 located between the upper substrate 012 and the lower substrate 011, as well as an upper polarizing sheet 015 and a lower polarizing sheet 016, and finally a sealant 017 is used for sealing. The liquid crystal grating 02 and the 2D display panel 01 can be laminated together by an OCR/OCA 03 to form a final naked-eye 3D touch control display module.

Figure 3:
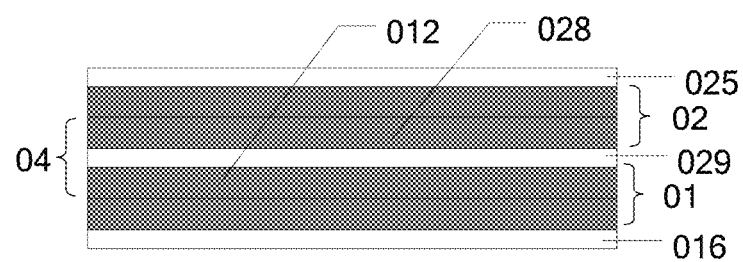
FIG. 3 is a schematic diagram of a placing height of a naked-eye three dimensional display device.

A general active naked-eye 3D display module needs to laminate the liquid crystal grating 02 with the 2D display panel 01 by the OCR/OCA 03, as shown in FIG. 3. The following requirements are required to be met: (1) the liquid crystal grating 02 usually needs two layers of substrates, and a technological process is complex; (2) in order to obtain the naked-eye 3D display effect, it still needs to laminate the liquid crystal grating 02 with the 2D display panel 01; (3) a laminating alignment precision is required to be +/−5 μm, which has very high requirements on a laminating device, and mass production efficiency is not high; (4) because the 3D display module needs 4 substrates, in order to ensure the 3D display effect, certain requirements exist on a placing height 04 (generally speaking, the closer a viewing distance is, the smaller the placing height is), due to an influence of thicknesses of the substrates, the viewing distance is farther, as a result, the 3D display effect will be poorer and the 3D effect cannot be presented very well. The placing height for example refers to a sum of the thickness of the lower substrate 028 of the liquid crystal grating 02, the thickness of the upper substrate 012 of the 2D display panel 01, and the thicknesses of layers between the lower substrate 028 of the liquid crystal grating 02 and the upper substrate 012 of the 2D display panel 01.

At least one embodiment of the present disclosure provides a naked-eye three dimensional display device. Such naked-eye three dimensional display device comprises a two dimensional display panel, a third substrate, a second liquid crystal layer, a first electrode and a second electrode, the two dimensional display panel includes a first substrate, a second substrate and a first liquid crystal layer disposed between the first substrate and the second substrate; the third substrate is disposed opposite to the second substrate on a side of the third substrate away from the first substrate; the second liquid crystal layer is disposed between the second substrate and the third substrate; the first electrode is disposed on a side of the second substrate close to the third substrate, the second electrode is disposed on a side of the third substrate close to the second substrate, and the first electrode and the second electrode are configured to apply an electric field to liquid crystal in the second liquid crystal layer to form a light splitting device for three dimensional display.

According to the naked-eye three dimensional display device provided by at least one embodiment of the present disclosure, the usage amount of one substrate can be reduced, a process is simplified, a laminating process is not needed, a yield is improved, and an investment of high-precision devices is reduced. Because of the usage amount of one substrate is reduced, a placing height is reduced, a viewing distance can be reduced, a better three dimensional display effect can be obtained in a smaller viewing distance and a cellphone use distance can be reached.

Explanation is carried out by several embodiments hereinafter.

Embodiment I

Figure 4:
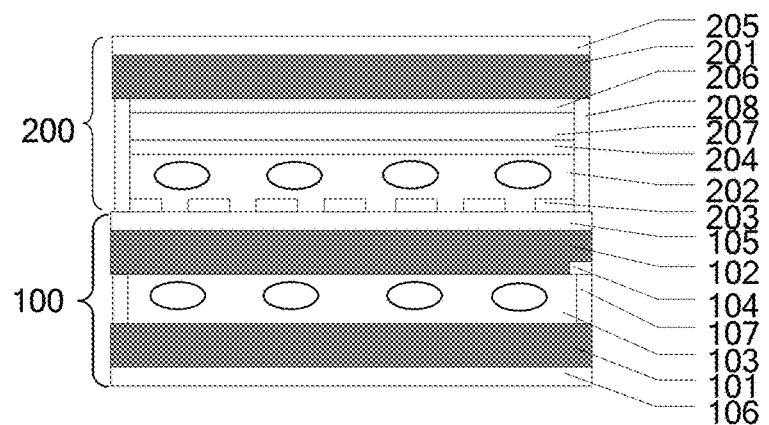
FIG. 4 is a schematic diagram of a naked-eye three dimensional display device provided by an embodiment of the present disclosure.

The present embodiment provides a naked-eye three dimensional display device, as shown in FIG. 4, the naked-eye three dimensional display device includes a two dimensional display panel 100. The two dimensional display panel 100 includes a first substrate 101, a second substrate 102 and a first liquid crystal layer 103 disposed between the first substrate 101 and the second substrate 102. The naked-eye three dimensional display device further includes a third substrate 201, a second liquid crystal layer 202, a first electrode 203 and a second electrode 204. The third substrate 201 is disposed opposite to the second substrate 102 on a side of the second substrate 102 away from the first substrate 101. The second liquid crystal layer 202 is disposed between the second substrate 102 and the third substrate 201. The first electrode 203 is disposed on a side of the second substrate 102 close to the third substrate 201, and the second electrode 204 is disposed on a side of the third substrate 201 close to the second substrate 102. The first electrode 203 and the second electrode 204 are configured to apply an electric field to liquid crystal in the second liquid crystal layer 202, such that the liquid crystal in the second liquid crystal layer 202 forms a light splitting device (liquid crystal light splitting device) 200 for 3D display.

In the present embodiment, one group of electrodes in the light splitting device 200 is disposed on a side of the second substrate 102 away from the first substrate 101, and the two dimensional display panel 100 and the light splitting device 200 share the second substrate 102. That is, the second substrate 102 serve as an upper substrate of the two dimensional display panel 100 and a lower substrate of the light splitting device 200 simultaneously. Such naked-eye three dimensional display device only includes three substrates, one substrate is reduced compared with 4 substrates required by a general naked-eye three dimensional display device, the placing height is reduced, the viewing distance can be reduced; for example, the viewing distance can be reduced to 150 mm from 550 mm, and reaches a cellphone use distance. In addition, a process of laminating the light splitting device 200 with the two dimensional display panel 100 is also omitted, the process is simplified, the yield is improved and the investment of high-precision devices is reduced.

For example, materials of the first electrode 203 and the second electrode 204 can be transparent conductive materials, for example, including any one of aluminum-doped zinc oxide, indium tin oxide or indium zinc oxide, which is not limited by the embodiment of the present disclosure in any form.

For example, at least one of the first electrode 203 and the second electrode 204 includes a plurality of strip electrodes.

For example, one of the first electrode 203 and the second electrode 204 includes a plurality of strip electrodes, and the other is a planar electrode, or each of the first electrode 203 and the second electrode 204 includes a plurality of strip electrodes. The plurality of strip electrodes are parallel with each other. When being powered on, liquid crystal molecules in regions directly facing to both the strip electrodes and the planar electrode or directly facing to the two groups of strip electrodes are deflected, light rays cannot transmit through, and a dark region (black region) is formed; the liquid crystal molecules in the region without the strip electrodes are not deflected, the light rays transmit through a liquid crystal cell and form a bright region; in this way, alternately bright and dark stripes can be formed, and a specific shielding relationship can be formed with subpixels (for example, RGB) of the two dimensional display panel 100. Under such mode, when an image viewed by a left eye is displayed on a liquid crystal screen, the non-transparent stripes will shield a right eye, similarly, when an image viewed by the right eye is displayed on the liquid crystal screen, the non-transparent stripes will shield the left eye, and visible images are separated by the left eye and the right eye to realize a 3D display effect.

For example, in the naked-eye three dimensional display device provided by an example of the present embodiment, as shown in FIG. 4, the first electrode 203 is disposed on the second substrate 102 and includes a plurality of strip electrodes, and the second electrode 204 is a planar (platy) electrode. Therefore, a patterning process can be adopted to form the strip first electrode 203, such that an error between the first electrode 203 and the subpixels can be reduced, a precision is improved, and a better 3D display effect can be obtained. Compared with the strip electrodes formed on the third substrate 201, the 3D display effect is better since a cell assembling precision is lower than a precision of the patterning process.

For example, in the naked-eye three dimensional display device provided by an example of the present embodiment, in order to obtain a better alignment effect between the light splitting device device and the 2D display panel, as shown in FIG. 4, the second substrate 102 further includes an alignment mark 104 for manufacturing the first electrode 203. For example, the alignment mark 104 is disposed on a side of the second substrate 102 close to the first substrate 101. The strip electrodes in the first electrode 203 are aligned by the alignment mark 104, it is required that an alignment precision between the alignment mark 104 and pixels on the second substrate 102 of the two dimensional display panel 100 is controlled within +/−5 µm, and only then the corresponding pixels can enter the left and right eyes of a viewer, to form the 3D display effect. For example, one alignment mark 104 as shown in FIG. 4 is merely schematic illustrated and two or more alignment marks can also be disposed, which is not limited herein.

For example, an included angle of 10°-15° can be formed between the strip electrodes and a row direction or column direction of the subpixels of the naked-eye three dimensional display device, thereby better avoiding occurrence of interference stripes.

For example, in the naked-eye three dimensional display device provided by an example of the present embodiment, as shown in FIG. 4, such naked-eye three dimensional display device further includes a polarizing layer 105, disposed on a side of the second substrate 102 close to the third substrate 201. The first electrode 203 is in direct contact with the polarizing layer 105, a process of laminating the light splitting device 200 with the two dimensional display panel 100 is omitted, the yield is improved and the investment of high-precision devices is reduced. Compared with a case that two polarizing sheets need to be disposed between the lower substrate of the light splitting device and the upper substrate of the 2D display panel in a general laminating process, the naked-eye three dimensional display device provided by the example can reduce the number of the polarizing sheets, thereby further reducing the placing height.

For example, in the naked-eye three dimensional display device provided by an example of the present embodiment, as shown in FIG. 4, such naked-eye three dimensional display device further includes a first polarizing sheet 106, and a light transmission axis direction of the first polarizing sheet 106 is perpendicular to that of the polarizing layer 105, such that the 2D liquid crystal display panel can realize 2D display.

For example, in the naked-eye three dimensional display device provided by an example of the present embodiment, as shown in FIG. 4, such naked-eye three dimensional display device further includes a second polarizing sheet 205. Equal voltage can be applied to the plurality of strip electrodes, such that the light splitting device forms the liquid crystal grating. The first polarizing sheet 106 is disposed on a side of the first substrate 101 away from the second substrate 102; and the second polarizing sheet 205 is disposed on a side of the third substrate 201 away from the second substrate 102. The light transmission axis directions of the first polarizing sheet 106 and the second polarizing sheet 205 are set to be the same direction perpendicular to that of the polarizing layer 105 to realize the 3D display function. For example, in the naked-eye three dimensional display device provided by an example of the present embodiment, by regulating a voltage between the first electrode 203 and the second electrode 204 in the light splitting device 200, liquid crystal in the second liquid crystal layer 202 can be deflected for different angles to in a columnar lens form (for example, the electrodes on the whole surface are applied with a certain voltage, and different voltages are applied to the strip electrodes to obtain the columnar lens form) for 3D display. In such case, the second polarizing sheet 205 may not be disposed. For example, a width of the strip electrodes in the first electrode 203 is greater than 5 µm generally.

For example, in the naked-eye three dimensional display device provided by an example of the present embodiment, as shown in FIG. 4, such naked-eye three dimensional display device further includes a touch control electrode 206, disposed on a side of the third substrate 201 close to the second substrate 102. For example, the touch control electrode 206 is closer to the third substrate 201 than the second electrode 204, thereby obtaining a better touch control effect. A transparent insulating layer 207 is disposed between the touch control electrode 206 and the second electrode 204. The touch control electrode 206 can be a plurality of mutually independent self-capacitance electrodes which are arranged in a matrix. For example, when a finger touches, a capacitance of the finger will be superimposed to the corresponding touch control electrodes, and a touch control position can be judged by detecting capacitance value changes of respective touch control electrodes. The naked-eye three-dimensional display device can also be in a mutual capacitance touch control mode. For example, the touch control electrode 206 includes a plurality of touch control drive electrodes or a plurality of touch control sensing electrodes, or includes a plurality of touch control drive electrodes and a plurality of touch control sensing electrodes which are insulated from each other. When the touch control electrode 206 is the touch control sensing electrodes, the touch control drive electrodes can be multiplexed by other layers, for example, the strip first electrodes or second electrodes are multiplexed as the touch control drive electrodes. In this case, the touch control electrode can include a plurality of strip electrodes parallel with each other and perpendicular to the strip first electrodes or strip second electrodes. When a finger touches the touch control panel, capacitive coupling nearby a touch point is affected, such that capacitances of capacitors nearby the touching point are changed. The touch control position can be judged by detecting the change of a capacitance value. Therefore, by disposing the touch control layer 206, the touch control function can be realized to further improve man-machine interactivity.

For example, a material of the touch control electrode 206 can be a transparent conductive material, for example, including any one of aluminum-doped zinc oxide, indium tin oxide or indium zinc oxide, which is not limited by the present embodiment in any form.

For example, in the naked-eye three dimensional display device provided by an example of the present embodiment, as shown in FIG. 4, the first liquid crystal layer 103 is sealed between the first substrate 101 and the second substrate 102 by the first sealant 107; and the second liquid crystal layer 202 is sealed between the second substrate 102 and the third substrate 201 by the second sealant 208.

In the embodiment above, a case that the first electrode and the second electrode are respectively disposed on the second substrate and the third substrate is taken as an example for explanation. However, the embodiments according to the present disclosure are not limited thereto. For example, the embodiments according to the present disclosure further include a case that the first electrode and the second electrode are both disposed on the second substrate or the third substrate. In this case, the first electrode and the second electrode can be strip electrodes alternately disposed. Therefore, according to the embodiments of the present disclosure, the first electrode and the second electrode can be disposed between the second substrate and the third substrate and configured to apply an electric field to liquid crystal in the second liquid crystal layer to form a light splitting device for three dimensional display.

Embodiment II

Figure 5:
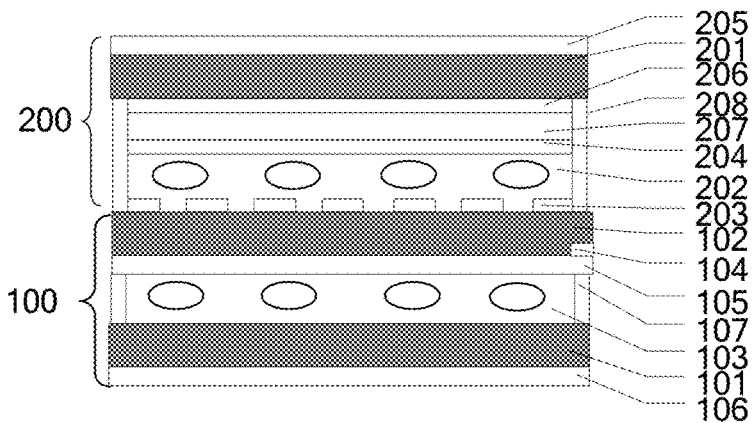
FIG. 5 is a schematic diagram of a naked-eye three dimensional display device provided by an embodiment of the present disclosure.

The present embodiment provides a naked-eye three dimensional display device, and differs from the embodiment I in that as shown in FIG. 5, the polarizing layer 105 of such naked-eye three dimensional display device is disposed on the side of the second substrate 102 close to the first substrate 101. The first electrode 203 is in direct contact with the second substrate 102. Therefore, it is favorable for forming the first electrode 203.

Embodiment III

Figure 6:
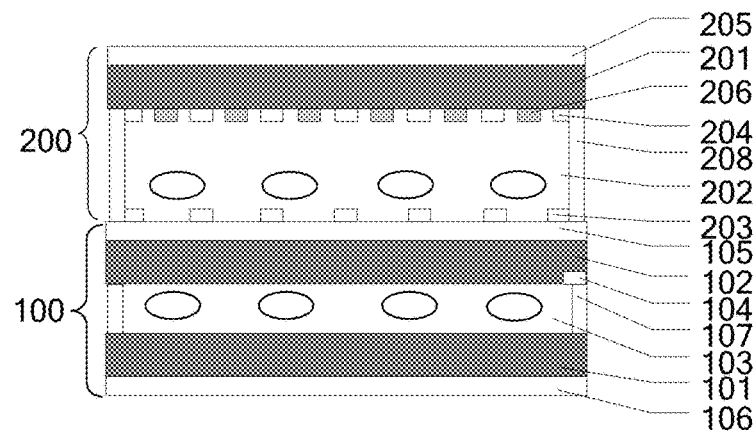
FIG. 6 is a schematic diagram of a naked-eye three dimensional display device provided by an embodiment of the present disclosure.

The present embodiment provides a naked-eye three dimensional display device, and differs from the embodiment I in that as shown in FIG. 6, the touch control electrode 206 includes a plurality of mutually independent self-capacitance electrodes which are arranged in a matrix, and the plurality of self-capacitance electrodes of the touch control electrode 206 are disposed on the same layer with and insulated from the plurality of strip electrodes of the second electrode 204. For example, at least one column of the self-capacitance electrodes is disposed between two adjacent strip electrodes, and each column of the self-capacitance electrodes includes a plurality of mutually independent self-capacitance electrodes. Therefore, the process is saved, and efficiency is improved.

For example, the touch control electrode 206 and the plurality of strip electrodes of the second electrode 204 can be driven by adopting a time-sharing drive manner, thereby reducing an interference between a touch control signal and a 3D display signal.

The embodiment of the present disclosure further provides a manufacturing method for a naked-eye three dimensional display device, the method includes the following steps: forming a two dimensional display panel, the two dimensional display panel including a first substrate, a second substrate and a first liquid crystal layer disposed between the first substrate and the second substrate; forming a first electrode on a side of the second substrate away from the first substrate; forming a second electrode on a third substrate; performing cell assembling on the two dimensional display panel with the first electrode formed thereon and the third substrate with the second electrode formed thereon, and forming a second liquid crystal layer between the second substrate and the third substrate, the first electrode and the second electrode being configured to apply an electric field to liquid crystal in the second liquid crystal layer to form a light splitting device for three dimensional display.

In an example, the manufacturing method for a naked-eye three dimensional display device includes the following steps:

S1: forming a two dimensional display panel, the two dimensional display panel including a first substrate, a second substrate and a first liquid crystal layer disposed between the first substrate and the second substrate;

S2: forming a polarizing layer and a first electrode on a side of the second substrate away from the first substrate in sequence;

S3: manufacturing a touch control layer, an insulating layer and a second electrode on the lower surface of the third substrate in sequence;

S4: performing cell assembling on the two dimensional display panel and the third substrate which are prepared, and injecting liquid crystal to form a second liquid crystal layer between the second substrate and the third substrate, wherein a light splitting device can be formed by sealing of sealant; and S5: attaching a first polarizing sheet and a second polarizing sheet to the upper and lower surfaces of a combination of the two dimensional display panel and the light splitting device to form the final naked-eye three dimensional display device.

For example, the polarizing layer can be formed on the side of the second substrate away from the first substrate by a nano-impressing technology; the first electrode is formed on the polarizing layer by sputtering, exposing and etching, the first electrode is aligned by an alignment mark, it is required that an alignment precision between the alignment mark and pixels on the second substrate is controlled within +/−5 µm, such that the corresponding pixels can enter the left and right eyes of people to form a 3D visual display effect. The touch control layer is manufactured on the lower surface of the third substrate, such touch control layer can be designed in one layer or multiple layers. The insulating layer is then to be prepared after the touch control layer is finished, and the insulating layer is used for isolating the touch control layer and the second electrode to prevent short circuit. A layer of second electrode is then manufactured after the insulating layer. Then the two dimensional display panel and the third substrate are aligned to form a cell, meanwhile the liquid crystal is injected to form the second liquid crystal layer to form the naked-eye three dimensional display device. The second electrode and the first electrode form an electric field to drive the liquid crystal to rotate to form the light splitting device.

For example, the nano-impressing technology is to transfer a pattern to a corresponding base by a template, a transfer medium is usually a very thin polymer film, and the structure of the polymer film is hardened by a method such as hot pressing or radiating to leave the transferred pattern. Firstly, the base is coated with a thin layer of thermal plastic high molecular material and temperature is raised to above a glass-transition temperature (Tg) of this thermal plastic material. The thermal plastic material a high elastic state has reduced viscosity and increased flowability, and then a nanoscale die is pressed thereon and a proper pressure is applied. A cavity in the die will be filled by the thermal plastic material, in this process, and a thickness of the thermal plastic material is greater than a height of the cavity of the die, thereby avoiding a damage caused by direct contact between the die and the base. After the die pressing process is finished, the temperature is reduced to cure the thermal plastic material, and therefore, a pattern capable of coinciding with the die can be realized. The die is removed subsequently and anisotropic etching is performed to remove residual polymer to obtain the pattern of the thermal plastic material. Then pattern transfer is performed. The pattern transfer can adopt an etching or peeling method. For the etching technology, the pattern of the thermal plastic material is taken as a mask, and anisotropic etching is performed on a film layer in contact with the mask thereunder to obtain the corresponding pattern. For the peeling process, a metal film is plated on the pattern of the thermal plastic material on the base (due to the pattern of the disposed thermal plastic material, the metal film is not continuous, and a side section of the pattern of the thermal plastic material for example can be an inverted trapezoid structure), then an organic solvent is used to dissolve the thermal plastic polymer material, the metal thereon is also peeled off, and the metal film in tight contact with the base is reserved, thereby obtaining the transferred pattern. An imprinted printed polarizing layer can be formed by such method.

For example, a material of the polarizing layer is a high molecular material. For example, the polarizing layer can include an iodine series polarizing layer and a dye series polarizing layer. Further, the polarizing layer can include an iodine polyvinyl alcohol (I-PVA) type and a dichroism organic dye type, etc., but not limited thereto. Different from a general stretching manner, the present disclosure can form the polarizing layer by adopting a manner of forming the high molecular film at first and then adopting the nano-impressing. The present disclosure does not limit a material of the polarizing layer and that of the thermal plastic material.

The naked-eye three dimensional display device obtained by the present disclosure through the manufacturing method can achieve at least one of the following beneficial effects: (1) the first electrode is manufactured by using a back side of the second substrate, the use amount of one substrate is reduced, and the process is simplified; (2) a laminating process is not required, the technological process is simplified, the yield is improved, and the investment of high-precision devices is reduced; (3) the alignment mark only needs to be reserved on the side of the second substrate during design, when the first electrode is manufactured on the back side of the second substrate, the second substrate is used to reserve the alignment mark for alignment, and the precision can be controlled within +/−5 µm; (4) since the use amount of one substrate is reduced, a placing height is reduced, a viewing distance can be reduced, a 3D display effect is ensured, and the viewing distance of a display device adopting the embodiments of the present disclosure can be reduced to 150 mm from 550 mm and reaches a cellphone use distance.

Some following points need to be explained:

(1) Unless otherwise defined, in the embodiments and drawings of the present discourse, the same reference sign represents the same meaning.

(2) The drawings of the embodiments of the present disclosure only relate to the structures involved in the embodiments of the present disclosure, and other structures can refer to a general design.

(3) In order for clearness, in the drawings for describing the embodiments of the present disclosure, the thickness of a layer or region is amplified. It is appreciated that when the element such as a layer, a film, a region or a substrate is called to be located "on" or "under" another element, the element can be "directly" located "on" or "under" the another element, or an intermediate element exists.

What are described above are only specific embodiments of the present disclosure, and the protection scope of the present disclosure is not limited thereto. It shall easily occur to one person skilled in the art within the technical scope of the disclosure of the present disclosure that various changes or replacements shall be covered within the scope of the present disclosure. Therefore, the scope of the present disclosure should be the scope of the following claims.

The application claims priority of Chinese Patent Application No. 201621058121.2 filed on Sep. 14, 2016, the disclosure of which is incorporated herein by reference in its entirety as part of the present application.

The invention claimed is:

1. A naked-eye three dimensional display device, comprising:
    a two dimensional display panel, comprising a first substrate, a second substrate and a first liquid crystal layer disposed between the first substrate and the second substrate;
    a third substrate, disposed opposite to the second substrate on a side of the second substrate away from the first substrate;
    a second liquid crystal layer, disposed between the second substrate and the third substrate; and
    a touch control electrode, disposed on a side of the third substrate close to the second substrate,
    wherein a first electrode and a second electrode are disposed between the second substrate and the third substrate, and the first electrode and the second electrode are configured to apply an electric field to liquid crystal in the second liquid crystal layer to form a light splitting device for three dimensional display
    wherein the touch control electrode includes a plurality of self-capacitance electrodes, and the plurality of self-capacitance electrodes of the touch control electrode and a plurality of strip electrodes of the first electrode or the second electrode are disposed on a same layer and are insulated from each other, at least one column of the self-capacitance electrodes is disposed between adjacent two of the strip electrodes, and each column of the self-capacitance electrodes includes a plurality of the self-capacitance electrodes independent from each other.

2. The naked-eye three dimensional display device according to claim 1, wherein the touch control electrode is closer to the third substrate than the second electrode, and a transparent insulating layer is disposed between the touch control electrode and the second electrode.

3. The naked-eye three dimensional display device according to claim 1, wherein the first liquid crystal layer is sealed between the first substrate and the second substrate by a first sealant; and the second liquid crystal layer is sealed between the second substrate and the third substrate by a second sealant.

4. The naked-eye three dimensional display device according to claim 1, further comprising a polarizing layer, disposed on a side of the second substrate close to the first substrate.

5. The naked-eye three dimensional display device according to claim 1, wherein the first electrode is disposed on a side of the second substrate close to the third substrate, and the second electrode is disposed on a side of the third substrate close to the second substrate.

6. The naked-eye three dimensional display device according to claim 5, wherein the first electrode is in direct contact with the second substrate.

7. The naked-eye three dimensional display device according to claim 1, wherein the second substrate further includes an alignment mark configured for manufacturing the first electrode.

8. The naked-eye three dimensional display device according to claim 7, wherein the alignment mark is disposed on a side of the second substrate close to the first substrate.

9. The naked-eye three dimensional display device according to claim 1, further comprising a polarizing layer, disposed on a side of the second substrate close to the third substrate.

10. The naked-eye three dimensional display device according to claim 9, wherein the first electrode is in direct contact with the polarizing layer.

11. The naked-eye three dimensional display device according to claim 1, further comprising a first polarizing sheet, disposed on a side of the first substrate away from the second substrate.

12. The naked-eye three dimensional display device according to claim 11, further comprising a second polarizing sheet, disposed on a side of the third substrate away from the second substrate.

* * * * *